United States Patent [19]

Groh

[11] 4,007,026
[45] Feb. 8, 1977

[54] COMPACT DUST FILTER SYSTEM

[75] Inventor: Andrew F. Groh, Cupertino, Calif.

[73] Assignee: FMC Corporation, San Jose, Calif.

[22] Filed: Aug. 13, 1975

[21] Appl. No.: 604,275

[52] U.S. Cl. .................................. 55/302; 55/334; 55/341 R; 55/356; 55/378; 55/381; 55/498; 55/502; 55/521; 55/524; 55/DIG. 3; 15/352

[51] Int. Cl.² ........................................ B01D 46/04

[58] Field of Search ............ 55/283, 284, 302, 319, 55/334, 341, 361, 378, 379, 381, 382, 498, 502, 507, 524, 528, DIG. 3, DIG. 26, 356, 497, 499, 521; 15/347, 349, 353, 352; 210/333, 333.1

[56] References Cited

UNITED STATES PATENTS

| | | | |
|---|---|---|---|
| 1,901,438 | 3/1933 | Davidson | 55/361 |
| 2,308,310 | 1/1943 | Ruemelin, Jr. et al. | 55/502 X |
| 2,654,440 | 10/1953 | Robinson | 55/524 X |
| 2,748,948 | 6/1956 | Fricke et al. | 210/440 |
| 2,784,440 | 3/1957 | Newport | 55/302 |
| 3,013,667 | 12/1961 | Jackson et al. | 210/493 |
| 3,173,777 | 3/1965 | Tamny | 55/379 X |
| 3,256,679 | 6/1966 | Snyder | 55/293 |
| 3,291,310 | 12/1966 | Marvel | 55/379 X |
| 3,448,862 | 6/1969 | Kudlaty | 55/498 |
| 3,513,638 | 5/1970 | Young | 55/302 |
| 3,541,631 | 11/1970 | Kluge et al. | 55/341 PC |
| 3,798,878 | 3/1974 | Pausch | 55/302 |
| 3,826,066 | 7/1974 | Higgins | 55/341 |
| 3,853,509 | 12/1974 | Leliaert | 55/341 R |
| 3,885,932 | 5/1975 | Moore, Jr. et al. | 55/319 |

FOREIGN PATENTS OR APPLICATIONS 812,244  7/1957  United Kingdom ............ 55/283

Primary Examiner—Frank W. Lutter
Assistant Examiner—David L. Lacey
Attorney, Agent, or Firm—C. E. Tripp

[57] ABSTRACT

An industrial sweeper has a filter unit in the debris hopper with the filter unit comprising rows of cartridges having pleated paper filter elements that are cyclically cleaned by reverse jet pulses of air without interrupting the filtering action by the main blower.

5 Claims, 10 Drawing Figures

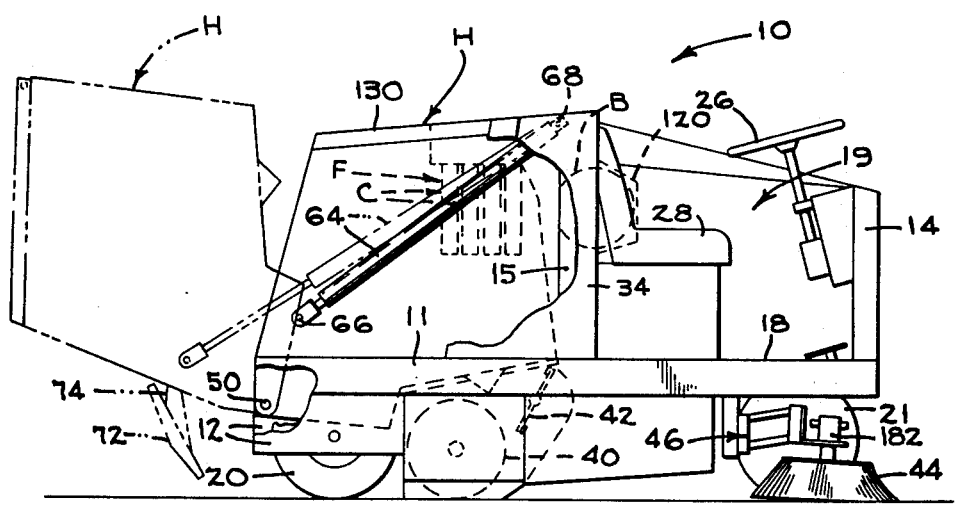
FIG_1
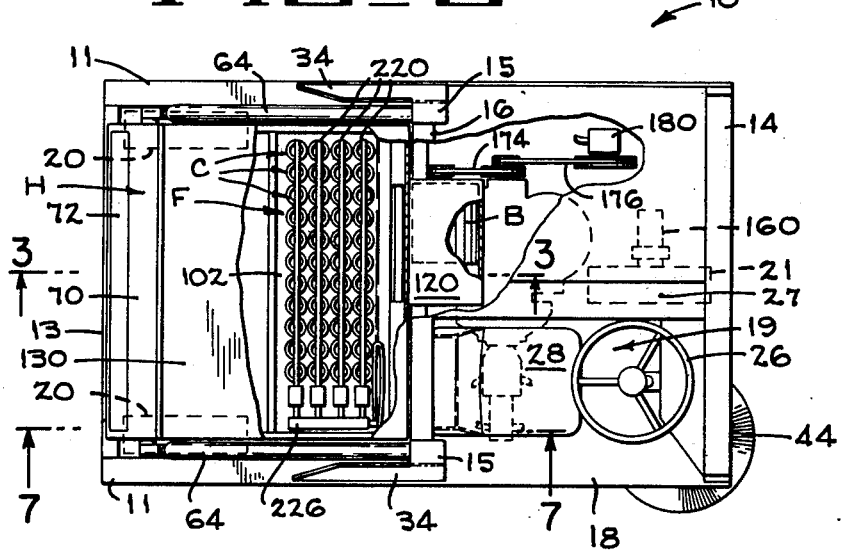
FIG_2

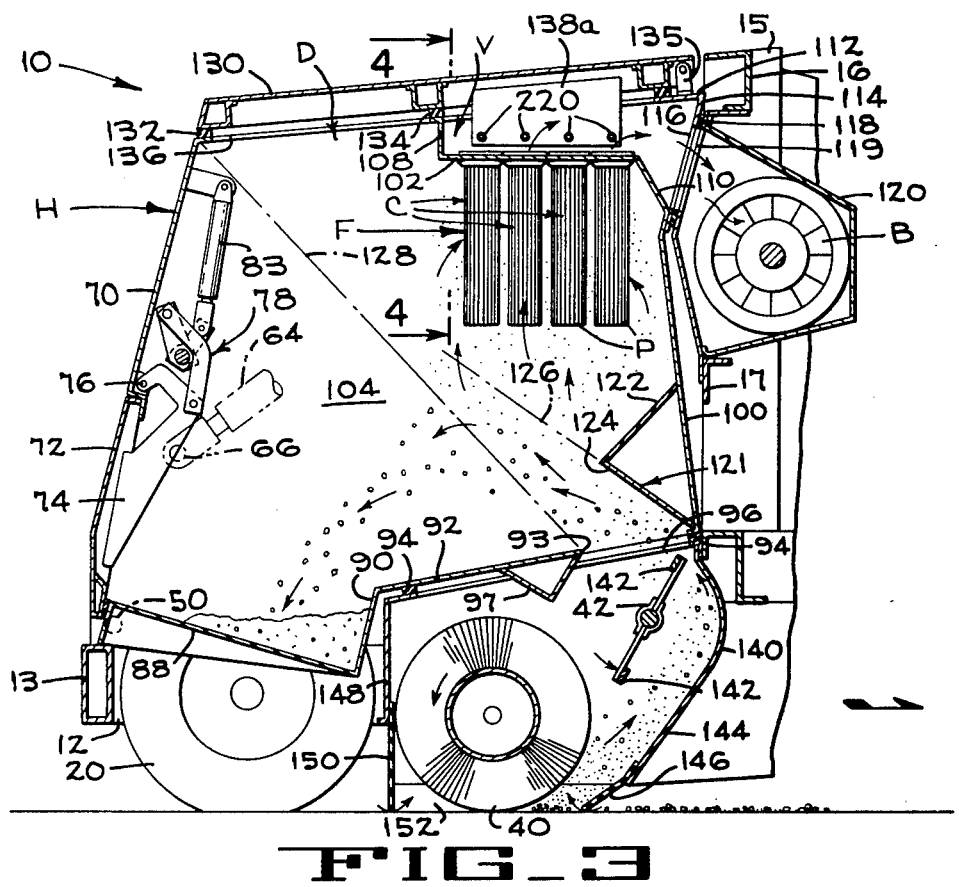
FIG_3
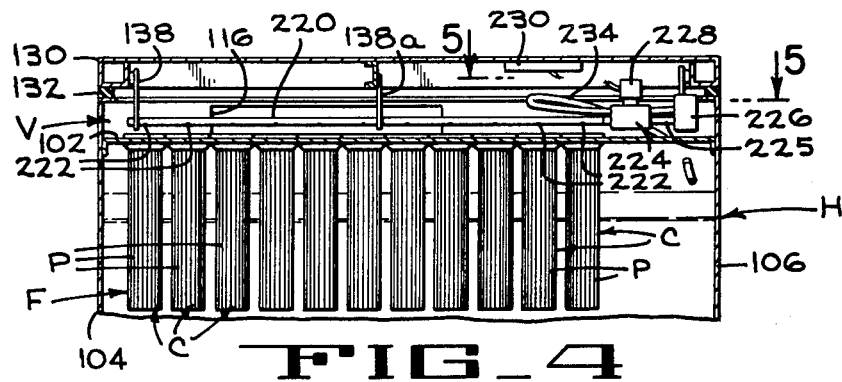
FIG_4
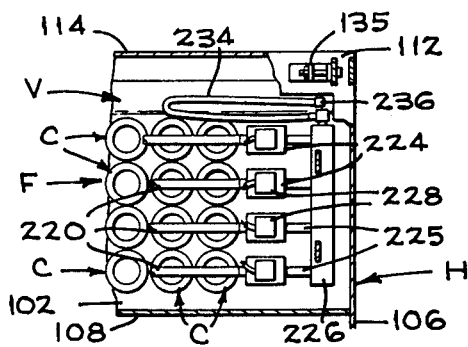
FIG_5

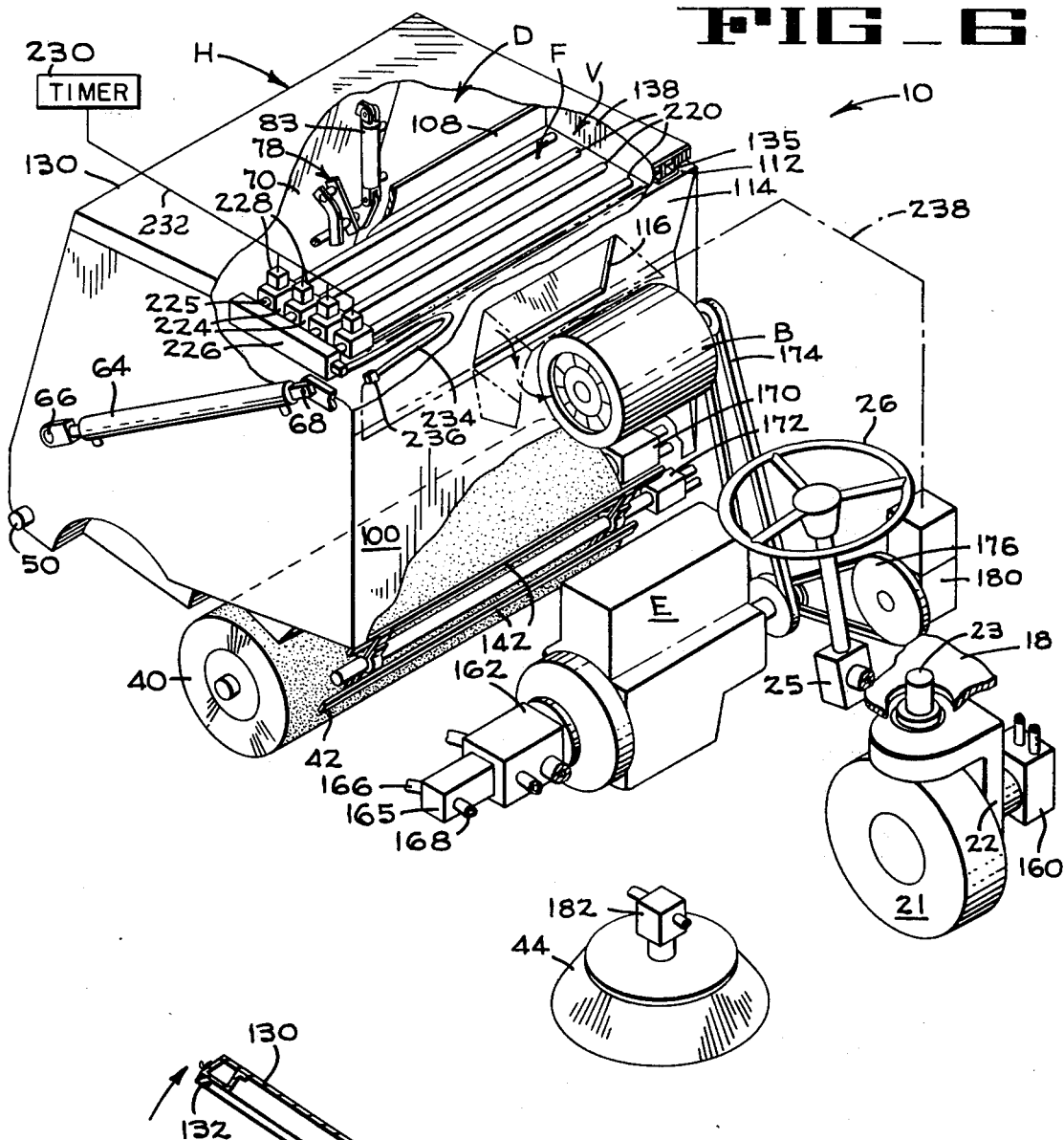
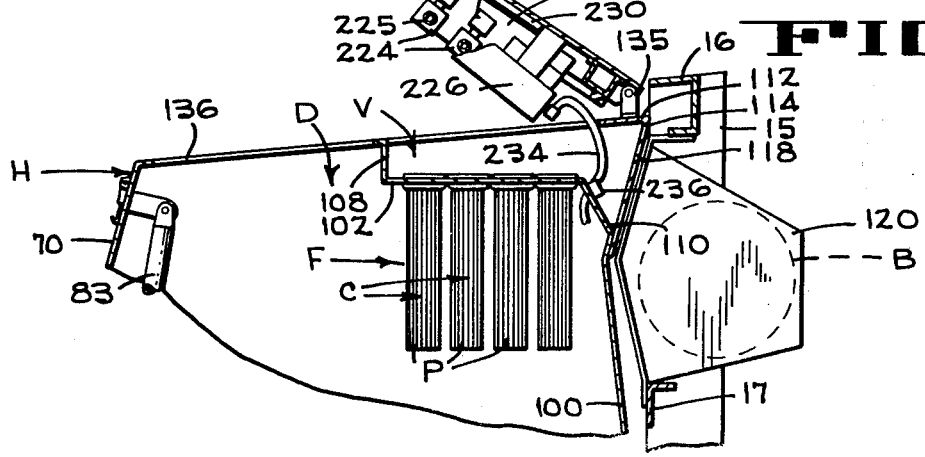

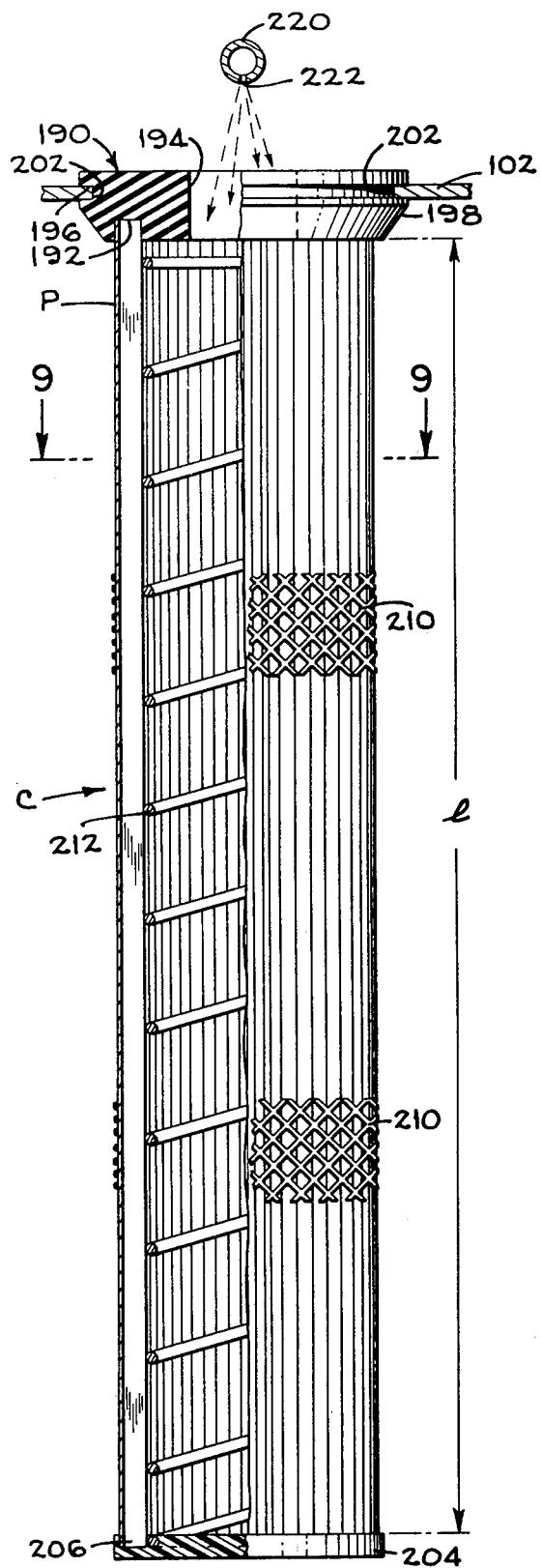
FIG_8
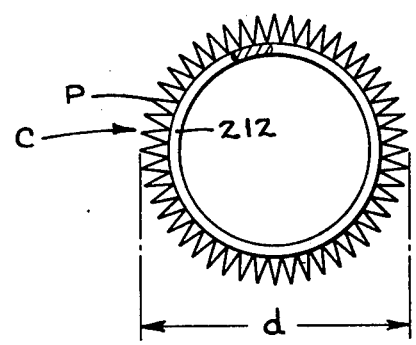
FIG_9
FIG_10

COMPACT DUST FILTER SYSTEM

FIELD OF THE INVENTION

This invention relates to filter systems for dust laden air and more specifically to such systems that are specifically adapted to installations wherein large volumes of air are drawn into the filter but wherein the volume available for the installation of an effective array of filter elements is restricted, such as in industrial sweepers, industrial vacuum cleaners or the like. The invention will be described in connection with an industrial sweeper embodying a rotating brush.

Description of Prior Art

The patent to Krier et al, U.S. Pat. No. 3,186,021 shows a street sweeper having a dirt receiving chamber that contains cloth filter bags. The filter bags occupy the entire longitudinal length of the hopper and the top of the hopper is closed by a hinged cover which defines the suction chamber. The bags are cleaned by vibrating the lower ends of the bags. A grid of angle bars below the bags deflects heavier particles away from the bags.

Kluge et al, U.S. Pat. No. 3,541,631 shows an industrial vacuum loader and cleaner having rows of fabric filter bags which must be removed when picking up wet material that would be injurious to the bags. The bags are cleaned, row by row, by reverse jets of compressed air entering venturi tubes within the bags. A vertical baffle shields the bags from the incoming dirty air.

Leliaert, U.S. Pat. No. 3,853,509 discloses a filter device wherein the filter elements are cleaned by reverse pulses of compressed air entering venturi tubes within the elements. The filter elements are fabric formed of cotton or other natural fibers, glass, asbestos, Orlon, etc. In one embodiment the filter fabric is formed into six pleats that are 8 inches in diameter and on 6 inch centers. The fabric flexes during the jet cleaning operation and the fabric is held into its pleated formation by two wire cages having axially extending wire members. One set of wires restrains the inner corners of the pleats from expanding and another set restrains the outer corners of the pleats from collapsing. During air jet cleaning, the filter fabric between the wires is flexed and collapse or ballooning of the fabric pleats is limited by the outer and inner wire cages.

Oetiker, U.S. Pat. No. 3,394,532 discloses a dust extracting plant having felt filter hoses that are below venturi tubes. These are cleaned by internal air jets that blow up the hoses from a convoluted to a cylindrical configuration with a jerk.

Hirs et al, U.S. Pat. No. 3,480,330 discloses a dust collector having filter tubes made of porous material, such as felt. In order to clean the tubes they are abruptly inflated or exploded by air blasts from depending pipes.

Medcalf et al, U.S. Pat. No. 3,509,689 and O'Dell, U.S. Pat. No. 3,816,978 disclose a filter arrangement employing fabric filter bags. The accumulated dirt is removed when pulses of compressed air cause movement of the tubular elements resulting from expansion thereof during the cleaning action. A double cone diffuser is mounted in each filter bag.

Colley et al, U.S. Pat. No. 3,726,066 discloses a dust collector having filters in the form of stockings or bags formed of felted fabrics. The filters are cleaned by air bursts from pipes projecting into venturis in the filter bags and which cause the filter tubes to be distorted by a whipping action. The pulsed duration of the air bursts is in the range of 5 – 215 microseconds with 20 – 45 microseconds being preferred. Each row of filters is pulsed once a minute. This patent discloses an air/cloth ratio in the range of 6 – 9. A vertical protective baffle is disposed between the dirty air inlet and the filter bags.

Wales, U.S. Pat. No. 3,816,979 discloses a tube type fabric filter wherein the dirty air flows into the bag interiors and filtered air leaves the bags externally. The filters are cleaned by pulsed air curtains that cause the bags to collapse for cleaning.

Leliaert et al, U.S. Pat. No. 3,606,736 shows a filtering apparatus wherein tubular filter stocking or bags are formed of felted fibers of cotton, silk, hemp, glass, asbestos, Orlon, Dacron or woven fabrics of similar materials. The bags are cleaned by air bursts from pipes that project into concentric nozzles within the bags, the bursts having a duration of 5 – 250 microseconds with 15 – 100 microseconds being preferred.

Wellan et al, U.S. Pat. No. 3,680,285 discloses a bag-type filter having rows of replaceable cylindrical filter bags wherein each row of bags is cleaned by air pulses once a minute from a flashing conduit. The inlet to each flushing conduit is controlled by a diaphragm valve.

Laliwala, U.S. Pat. No. 3,735,566 discloses a filtering apparatus employing cylindrical filter bags of woven wool material which are cleaned by jet air pulses emitted from nozzle tubes that project into the bags.

Ray, U.S. Pat. No. 3,757,497 discloses a filter apparatus having tubular filter bags of woven wool material and which are cleaned by jet pulses of air emitted from apertured pipes and directed into Venturis that project up from the bags. The pulses have a duration of 1/10th of a second with each row being cleaned every minute.

Brookman, U.S. Pat. No. 3,864,108 discloses a dust collector with jet induced air cleaning using vertical Venturis at opposite sides and employing tubular filters of finely woven or spun fibrous material.

Pausch patents, U.S. Pat. No. 3,538,687 and 3,765,152 discloses filtering devices wherein the filters are in the form of flexible fabric socks or bags. The bags are cleaned by pulsed jets of air that are directed into cup-shaped tubes at the tops of the bags (U.S. Pat. No. 3,538,687) or into Venturi tubes that project into the bags (U.S. Pat. No. 3,765,152).

Fricke et al, U.S. Pat. No. 2,748,948 discloses a filtering device for gasoline wherein the filter element is formed of resinous impregnated pleated paper. The majority of the outer periphery of the filter element is surrounded by an imperforate shell which acts as a baffle to restrict the inlet area of the filter during filtering operation. There is no jet cleaning.

Jackson et al, U.S. Pat. No. 3,013,667 discloses a pleated filter made of a porous sheet of paper, cardboard, felt, woven tissue or the like bonded to thermoplastic end elements. A coarsely perforated jacket confines the pleats along the entire length of the filter.

Vandenhoeck, U.S. Pat. No. 3,812,660 discloses filter bags having their lower ends mounted in a plate by means of a grooved silicone ring or grommet. The upper ends of the bags are closed and resiliently suspended to facilitate shaking the bags for cleaning.

As shown by the prior art just described, it has been proposed to suspend a number of tubular fabric filter bags from an apertured wall that separates a dust laden air inlet chamber from a filtered air chamber that is connected to a suction blower. The Kluge et al patent, U.S. Pat. No. 3,541,631, previously mentioned, cleans the cloth filter bags of a vacuum sweeper by the cyclic introduction of pulsed jets of high pressure air into the open ends of the filter elements. These jets of air cause expansion and flutter of the walls of the filter elements thereby dislodging the cake, or at least those particles thereof which have not become firmly embedded in the filter. However, when ususually wet refuse material is to be picked up the fabric filter tubes are removed as a unit.

Other patents previously discussed disclose pulse jet cleaning systems for fabric filter bags but are not concerned with volume limitations such as those encountered in industrial sweepers or the like.

Many of the prior art patents referred to introduce Venturi tubes or the like that project down into the filter cartridges, such as Kluge et al, U.S. Pat. No. 3,541,631 and Leliaert, U.S. Pat. No. 3,853,509 (FIG. 6). These provide a tortuous path for air drawn into the upper ends of the cartridges. Other prior patents provide tubes that project up from the upper ends of the cartridges, such as Oetiker, U.S. Pat. No. 3,394,532 and Hirs et al, U.S. Pat. No. 3,480,330. This increases the depth and hence the volume of the filter insulation.

One manner of comparing filters of the type referred to is by means of the air/cloth ratio. This ratio is defined as the ratio of the cubic feet per minute of air flowing through the filter system divided by the total area in square feet of the cloth in the filter elements. A low ratio has the advantage of providing a low pressure drop across the filter with a correspondingly high effectiveness for picking up dust laden air (as around a sweeper broom) and drawing it into the dirty air chamber. However, for a given air flow rate, a low ratio requires a relatively large total area of filter material and in some applications (such as sweeper installations) the volume physically available for enclosing an array of filter elements is limited.

When cloth filters are employed, it is known that the air/cloth ratio should not exceed 10/1 to prevent embedding and eventual blinding of the filter, otherwise the filter elements must be replaced frequently. As will be seen, the filter cartridges of the present invention are formed of pleated paper so that the term of art "air/cloth ratio" previously employed in the dust filter art wherein the filter elements were made of cloth or fabric will be termed the "air/paper ratio" in the detailed description of the present invention to follow.

A pleated fabric filter bag has been proposed, as in the aforesaid Leliaert patent, U.S. Pat. No. 3,853,509, which discloses six pleats. This filter requires two sets of restraining wires and associated cages to maintain the pleated configuration and replacement of an entire filter element would be costly or if the wire cages are to be saved would require a time consuming operation of threading the fabric around the cages. To adapt a wire cage pleated fabric filter construction to the utilization of a large number of shallow pleats would aggravate these problems.

Summary of the Present Invention

Some of the principle objects of the present invention can be summarized as follows:

a. To draw in large volumes of air from around the broom of an industrial sweeper in order to effectively pick up dirt from the broom housing and to control the amount of dust raised around the sweeper.

b. To effectively filter the air and to clean the filters automatically during operation of the sweeper employing a filter unit that occupies a relatively small total volume.

c. To provide a filter system which can employ a low air/filter area ratio but wherein the filter array occupies a relatively small volume enclosure.

d. To provide filter elements that are not subject to blinding, even if the air/filter ratios reach a value as high as 22/1.

e. To provide a filter unit of air pulse cleaned filter cartridges wherein no Venturi tubes are required inside the cartridges and wherein no air tubes need extend between the upper ends of the cartridges and the pulse air pipes.

In accordance with the present invention, the above listed objectives are accomplished by making the filter elements in the form of tubular elements formed of pleated porous paper. The paper is strengthened by impregnation with a resin and such paper is readily attainable in a form wherein the maximum particle size passed by the filter elements is 40 microns. This renders the filtered air adequately clean, even when the filter elements are new but as a filter cake develops the particle size that can pass through the filter is reduced still further.

The pleated paper filter elements are periodically cleaned without interrupting operation of the filter system by directing pulsed jets of high pressure air into the open ends of the tubular filters for dislodging dust accumulations deposited on the external surfaces of the filters. As the art shows, jet cleaning systems of this type have been previously employed in connection with cloth bag filters wherein the loosely mounted cloth bag material can flutter and expand in response to pressure waves generated by the pulsed jets of cleaning air. Unless complex wire restraining cages are employed, the use of pulsed jets of cleaning air on pleated fabric filters would unfold the pleats and radially expand the filters into mutual engagement.

Applicant has found that under dry conditions, no external restraining elements for the pleated paper cartridges are required. However, under wet conditions an inexpensive, open mesh annular restraining band can be applied to the exterior of the pleated paper cartridges, thereby restraining the expansion of the pleats in response to the pressure effects of the pulse jet cleaning air. Since the restraining band can act as a dust catcher, applicant has found that one or more narrow mesh band will provide all the restraint required under wet conditions and will minimize dust retention. As mentioned, under dry sweeping conditions no external bands are required. Applicant has also found that extensive mechanical expansion and opening of the pleats of the filter elements during air cleaning process is not necessary for jet pulse cleaning when the pleated paper filter elements of the present invention are employed, and that these elements will maintain their pleated shape and will be efficiently cleaned even though the paper material is relatively stiff and is not restrained from unfolding during the air jet cleaning process under dry conditions.

As to the pulse jet cleaning operation, prior systems have deemed it necessary to employ Venturi tubes that receive the jet pulses and direct them into the filter cartridges. As mentioned, tubes that project into the filter cartridges provide a tortuous path for air entering the upper ends of the cartridges. Air diffuser diamond shaped inserts have been suggested, as in O'Dell, U.S. Pat. No. 3,816,978; a quick acting diaphragm valve and metal tube-pressure chamber assembly has been employed, as in Wellan, U.S. Pat. No. 3,680,285; and valved tubes that depend from a pressure reservoir manifold and project down into the interior of the filter bags have been suggested, as in Laliwala, U.S. Pat. No. 3,735,566. These systems rely on drawing in additional cleaning air along with the cleaning jets.

The pulsed air cleaning system of the present invention is simpler, more economical and just as effective as these more complex prior systems. In applicant's system, the pleated paper filter elements are molded into an annular rubber-like plastic grommet formed with an external groove which can be readily snapped into and removed from an aperture in the filter support plate. The filter elements are mounted in rows (4 rows of 11 elements in a typical design) and a simple apertured air pipe or tube extends along and above each row. The interior walls of the grommets are of simple cylindrical shape and the inner peripheries of the pleated paper filter elements form continuations of the inner grommet walls. The air tube is drilled to provide a jet aperture above the center of each filter element grommet and the air tube is also spaced above the grommet. A quickly pulsed jet of high pressure air issuing directly from the drilled tube into the pleated paper filter cartridges provides effective cleaning. No Venturi or other tubes are employed, either depending from the air jet tube, extending between the cartridge and the air jet tube, or mounted to project down internally within the filter cartridges. The lack of downwardly projecting internal Venturi tubes provides a direct, non baffled path for air entering the upper ends of the filter cartridges during normal operation. The omission of tubes between the upper ends of the filter cartridges and the jet air pipe does not decrease the depth of the filter unit. Furthermore, omission of these pipes and tubes simplifies removal and replacement of the filter cartridges. No extra parts need be removed, replaced or transferred during such removal and replacement of the filter cartridges.

Another feature of the present invention, as it relates to sweepers, is directed to maximum utilization of the hopper for receiving dirt and to ease of replacement of the filter elements that depend into the hopper. In the embodiment of the invention to be described in detail, filter unit F comprises filter cartridges which are arranged in four rows of eleven cartridges. Each cartridge comprises a pleated paper filter element, and the peripheries of the filter elements are spaced. These cartridges depend from an apertured partition that forms one wall of the vacuum or filtered air chamber connected to the blower. The aforesaid partition has a horizontal apertured portion that occupies less than half the longitudinal or front to rear dimension of the hopper but which extends fully across the hopper, from side to side. The front edge of the partition is supported from a forward vertical wall of the hopper and forms one wall portion of a suction chamber connected to the blower. The rear edge of the apertured partition depends from a downwardly projecting flange that also extends from side to side of the hopper. The top of the hopper is closed by a hinged lid. This lid has seals which define and isolate the suction chamber for the filter cartridges and which close off an upper access opening in the hopper dirt chamber. The air tubes, associated valves and air manifold depend from the lid into the suction chamber above the filter cartridges and the manifold is connected by flexible hoses to an air compressor. With this construction, when the lid is raised, the air jet cleaning system is exposed for inspection, adjustment and repair. Also, when the lid is raised, not only are the upper ends of filter cartridges in the suction chamber exposed, but the access opening in the dirt chamber of the hopper is also opened so that an operator can reach through a large access opening in the rear upper portion of the hopper and grasp the filter cartridges for installation or replacement.

In the embodiment of the invention to be described in detail, the sweeper has a rear cylindrical broom of the underthrow type which throws dirt into the path of a rotating paddle or elevator. The elevator in turn flings the dirt up into the dirt receiving portion of the hopper. The lighter particles are also drawn into the hopper along with the flow of air drawn into the broom chamber by the blower. It has been recognized that protection of the filter elements from the rocks and stones and heavy particles flung into the hopper by a broom or paddle is a desirable feature. For example, in the patent to Colley et al, U.S. Pat. No. 3,726,066, a vertical baffle 106 overlies and is close to the full vertical extent of the filter elements and is interposed directly in front of the inlet for the dirt. This provides a tortuous 180° turn path for the dust before it reaches the filter. In accordance with the present invention, adequate protection of the filter elements from damage by impact is provided without restricting the inlet to the hopper and without providing a tortuous path for the flow of air from the hopper up to the filter elements. This feature is obtained by providing the hopper with an angled baffle which extends diagonally from the hopper inlet for a relatively short distance, and which is at such an angle that particles flung into the hopper by the elevator cannot have a trajectory that will strike the filter elements. The disposition of this baffle does not interfere with the flinging of dirt into the hopper or with the flow of air up through the hopper and to the filters.

BRIEF DESCRIPTION OF THE DRAWINGS

FIG. 1 is a side elevation of a street sweeper embodying the invention showing the hopper in its dump position in phantom lines.

FIG. 2 is a plan of the sweeper with a portion of the hopper lid broken away to show the filter elements.

FIG. 3 is an enlarged section through the rear of the machine taken at 3 — 3 of FIG. 2.

FIG. 4 is a partial section through the hopper taken on line 4 — 4 of FIG. 3.

FIG. 5 is a partial section through the vacuum chamber taken on line 5 — 5 of FIG. 4.

FIG. 6 is a diagramatic perspective showing various drive and hydraulic elements.

FIG. 7 is a partial section taken at 7 — 7 of FIG. 2 with the hopper lid open.

FIG. 8 is an enlarged side view of one of the filter elements with parts broken away.

FIG. 9 is a section of the filter cartridge taken on line 9 — 9 of FIG. 8.

FIG. 10 is an enlarged partial section of a filter cartridge.

GENERAL DESCRIPTION OF THE SWEEPER

The major elements of an industrial type sweeper 10 embodying the present invention is shown in FIGS. 1 and 2 and FIG. 3 is a somewhat enlarged sectional view showing additional details of the hopper construction.
FIG. 6 is a schematic perspective illustrating means for driving the various elements.

As seen in FIGS. 1, 2 and 3, the sweeper 10 embodies side frame elements 11 and dependent rear frame elements 12 for mounting the rear wheels (FIG. 3), a rear cross channel 13, a vertical front panel 14, and intermediate vertical posts 15 connected by cross channels 16 and 17 (FIG. 3). A front floor 18 is provided, and there is a compartment 19 for access to various components. Non-driven and freely running rear wheels 20 are mounted on the rear frame elements 12.

The sweeper is of the driven front wheel type wherein a single centralized front wheel 21 is mounted on a vertically extending bracket structure 22 (FIG. 6) that can be pivoted by a vertical shaft 23 mounted in a bearing secured to the floor 18. Linkage (not shown) is operated by a gear box 25 controlled by a steering wheel 26 for steering the front wheel about its shaft 23, it being understood that the details of the steering mechanism are not critical to the present invention. A panel 27 (FIG. 2) accessible to the operator's seat 28 mounts control valves for the hydraulic units as well as switches for any electrical units present on the sweeper.

Side plates 34 (FIG. 2) project rearwardly from the upright posts 15. The posts 15 serve to mount hydraulic tilt cylinders connected to a hopper, indicated generally at H and fitted at the rear of the sweeper.

As best seen in FIG. 6 an internal combustion engine is mounted crosswise of the chassis between hopper H and the front wheel 21.

As best seen in FIG. 3, just ahead of the rear wheels 20 is a main cylindrical broom 40 which is of the underthrow type. The broom sweeps up debris and dust and directs it into the path of a rotating paddle or elevator 42 which flings the material into the hopper H. The broom 40 can be raised and lowered by the operator by any of several constructions known in the art, the details of this mechanism not being critical to the present invention.

This collecting action is augmented by a blower system which draws air into the broom compartment, into the hopper H, and through a filter unit F.

At the right front of the machine, a curb or side brush 44 (FIGS. 1 and 2) is supported by a parallel linkage assembly indicated generally at 46 in a manner well known in this art. The curb brush 44 can also be raised and lowered by the operator in a known and conventional manner, the details of this mechanism not being critical to the invention.

As best seen in FIGS. 3, 4 and 5, the hopper H embodies the filter unit F which includes rows of depending cartridges C tubular pleated paper filter elements P (FIGS. 8 – 10), the details of which will be described presently. It will be noted that the pleats of the pleated filter elements P are not interdigitated and that the cylindrical envelopes forming the peripheries of the filter elements are spaced from one another. Material swept up by the cylindrical broom 40 and relayed on by the elevator 42 is flung into the hopper H and dust particles entrained in the air drawn into the hopper are drawn through the filter F by a blower B which is shown as being of the axial fan type, but which can be of any type. Filtered air drawn through the filter and into the blower is discharged into the atmosphere from one end of the blower.

General Hopper Construction

The hopper H is mounted at the rear of the machine so that it can be hydraulically tilted to clear a debris receiver and the hopper can be hydraulically tilted to dump the debris through a hydraulically controlled door at the rear of the hopper. Referring principally to FIGS. 1 and 6, the lower rear portions of the side plates of the hopper are pivotally mounted at 50 to the frame or to structure associated therewith. In order to tilt the hopper, each side thereof is connected to a tilt cylinder 64. The piston of each cylinder is pivotally connected to the hopper at 66 and the cylinder is pivotally connected at 68 to a bracket (not shown) on the associated upright post 15. The hopper tilting details are not critical to the present invention.

The rear wall 70 of the hopper (FIG. 3) is apertured to receive a dump door 72. The door 72 is mounted on bell crank brackets 74, the upper ends of which are pivoted to the rear hopper wall 70 at 76. An intermediate portion of each door bracket 74 is connected by a linkage assembly 78 that is operated by a hydraulic cylinder 83 pivotally mounted on the rear wall 70 of the hopper. The details of the door operating mechanism are not critical to the invention.

The hopper H, as best seen in FIG. 3, has an inclined rear bottom wall portion 88 connected to a short upright wall portion 90 which in turn connects to an upwardly inclined bottom wall portion 92 that partially overlies the broom housing. The wall portion 92 terminates at an aperture 93 which receives dirt from the paddle 42 along with air drawn in by the blower. As indicated in FIG. 3, a rectangular rubber-like seal 94 surrounds a rectangular opening 96 in the broom housing for making an air tight connection with overlying flange portions of the hopper that surround the broom housing. The bottom wall of the hopper also has a V-shaped depending channel 97 that deflects dirt that might otherwise be flung back behind the broom 40.

The hopper has a generally vertical front wall portion 100 and mounts a horizontal, apertured filter mounting partition 102, as best seen in FIGS. 3 and 4. The partition 102 extends between the vertical side walls 104, 106 of the hopper, as seen in FIG. 4. The filter mounting partition 102 is suspended at its rear end and at an intermediate portion of the hopper by a depending flange 108 (FIGS. 3 and 6) and is supported by an inclined flange 110 (FIG. 3) which joins with the vertical hopper wall 100, previously described. The upper front portion of the hopper includes a short wall section 112 that extends from side to side of the hopper as seen in the upper right of FIG. 3. The wall section 112 joins a downwardly projecting front wall portion 114 that also extends between the sidewalls of the hopper and joins the upper front wall portion 100. The wall portion 114 is apertured at 116 to provide an air inlet to the blower B. A rubber gasket 118 surrounds an aperture 119 on a blower housing 120 (FIG. 3) for establishing sealed communication between the aperture 116 in the front wall of the hopper (FIG. 3) and the aperture 119 in the blower housing 120.

The lower front portion of the front vertical wall 100 of the hopper H is provided with a baffle channel 121 having an angled upper wall 122 which connects to a lower, upwardly and rearwardly inclined wall 124. As indicated by the broken line 126 in FIG. 3, which line forms an extension of the lower wall 124, although the wall 124 is relatively short, it limits the trajectory of heavy particles flung into the hopper by the elevator paddle 42 so that such particles cannot strike the pleated filter elements P of the filter unit F. On the other hand, the channel 121 and its lower wall 124 offer substantially no impedance to the flow of air from the entrance duct 93 of the hopper and through the walls of pleated paper filter elements of the filter unit F.

The lower broken line 128 in FIG. 3 illustrates the maximum height of particles that will normally be accumulated in the hopper H before the hopper is dumped. Since the filter unit F extends less than half the distance from the front wall 100 to the rear wall 70 of the hopper and since the filter elements are relatively short (only 1 foot long in the present example) the hopper can accumulate a large volume of debris, without interfering with the filtering action, before the hopper must be dumped. This advantage stems from the improvements in the filter unit F which minimize its total volume, as will be described in detail presently.

The upper portion of the hopper H is closed by a lid 130 which has hinged brackets 135 projecting from the upper wall portion 112 of the hopper (FIG. 7). The lid 130 has a peripheral gasket 132 which seals around the periphery of the hopper. An intermediate transverse gasket 134 on the lid 130 seals with the transverse vertical flange 108 that mounts the rear edge of the filter platform 102. Thus, the lid divides the hopper into a main compartment D which receives dust laden air and a suction compartment V which communicates with the blower housing 120.

As seen in FIG. 7, the partition 102 that mounts the filter unit F and the depending flange 108 that supports one end of the partition stops short of the front end wall 70 of the hopper H. This arrangement, coupled with the structure of the lid 130 provides a large access opening 136 into the dust chamber D of the hopper. This facilitates an operator installing or removing filter cartridges depending from the partition 102. Thus, an operator can open the lid 130 and reach into the compartment V for removal and replacement of the filter cartridges C of the filter unit F. As will be described in detail presently, flanges 138 (FIG. 6) and 138a (FIG. 7) depend from the lid and support air pipes that provide reverse pulse jets of cleaning air for the pleated paper filter elements P. Thus, when the lid 130 is opened, not only is access provided to the filter cartridges but also to the air cleaning mechanism to be described presently. Also, with the lid opened, filter cartridges can be slid down through apertures in the partition 102 for initial assembly and during replacement.

Broom Housing

Referring to FIG. 3, the cylindrical broom 40 is mounted in a generally rectangular housing and picks up debris which is relayed into the dirt compartment D by the elevator paddle 42. The broom housing has a curved shroud portion 140 which matches the path of the paddle elements 142 on the elevator 42 to assist in elevating debris into the dirt chamber. Extending rearwardly from the curved shroud 140 is an inclined flange 144 that guides the debris up into the path of the elevator paddle 42. A flexible flap 146 depends from the flange 144 and engages the swept surface. The upper position of the broom housing has the opening 96 surrounded by the gasket 94 (FIG. 3), as previously described. The housing has a rear wall 148 which mounts a depending rear flap 150 for engaging the swept surface. The broom housing has opposed end walls and depending from each end wall is a side flap 152, one of which appears in FIG. 3. During operation, air is drawn into the broom housing beneath the flexible flaps as indicated by the arrows in FIG. 3.

Drive Arrangement

The means for driving the various elements of the sweeper appear in the schematic diagram of FIG. 6. The prime mover is an internal combustion engine E, the crank shaft of which drives two hydraulic pumps, the blower B for withdrawing air from the suction or vacuum chamber V of the housing and a compressor for supplying cleaning air for the filter elements. The steerable front wheel 20 is driven by a reversible hydraulic motor 160 (FIG. 6) connected by a pair of hydraulic lines (not shown) to a variable stroke reversible axial piston pump 162. The pump 162 has a variable angle swash plate controlled by the operator by mechanism not shown, it being understood that the details of the front wheel mounting, steering and drive are not critical to the present invention. Also, reversible, variable delivery pumps suitable for driving the front wheel are well known in the art.

The end of the crankshaft of the engine E that drives the variable delivery pump 162 also drives a constant delivery hydraulic pump 165 having delivery and return lines 166, 168. These lines connect to a series of control valves which can control operation of the associated hydraulic equipment in either direction or hold it in a selected position. The constant delivery hydraulic pump 165 operates through a valve system (not shown) and drives a hydraulic motor 170 for driving the main broom 40 and also operates a hydraulic motor 172 for the elevator paddle 42. The hydraulic connections and the valve systems are not shown in the diagram of FIG. 6 because details of this type represent conventional hydraulic engineering techniques which are not critical to the present invention. The valves and other controls for the sweeper may be fitted so as to be accessible from the operator's seat.

The blower B is driven mechanically from the opposite end of the crank shaft of the engine E by a V belt and pulley assembly 174 and another V belt and pulley assembly 176 drives an air compressor 180 for supplying compressed air to the cleaning units for the filter elements, to be described presently.

The constant delivery hydraulic pump 165 is also connected through various valve controls and lines (not shown) to the double acting hydraulic cylinders 64 that dump the hopper as well as the hydraulic cylinder 83 that opens and closes the dumping door 72 (shown in FIG. 3). The curb broom 44 is driven by the pump 165 through lines and a control valve (not shown) by means of a hydraulic motor 182, such drives being known in the art and not critical to the present invention.

Filter Cartridge Construction

The details of the preferred filter or cartridge construction appear in FIGS. 8 – 10. The filtering medium is formed of an annular or tubular pleated element P formed of resin impregnated paper approximately 0.030 inch thick with a nominal pore size of 40 micron. As seen in FIG. 10, the paper filter element P is pleated to form a number of generally radially extending, diverging panels 184, 186. Adjacent panels 184, 186 are connected at their radially inner ends along lines parallel to the element axis to form an exterior included angle *a* and each pair of these connected panels can be considered to form a pleat. The radially outer end of the panel 184 of one pleat is connected to the radially outer end of a panel 186 of an adjacent pleat on one side and the radially outer end of the panel 186 of said one pleat is connected to the radially outer end of a panel 184 on an adjacent pleat on the other side. Thus a unitary pleated filter element P having a continuous circular array of pleats is provided. The effective area of the filter element is substantially increased by the provision of the pleats. In the construction given here by way of example, the major diameter *d* (FIG. 9) of the filter element P is 2.37 inches and the exposed length *l* (FIG. 8) of the element is about 12 inches. With a selected diameter *d* of the pleated element P the pleat configuration is determined by giving consideration to maximizing the total filter area while making it possible to effectively clean the filter cake from the exterior surfaces of the pleats by pulsed jets of air directed into the inside of the element. In the preferred embodiment the pleated element P is 2.37 inches in diameter, and as indicated in FIG. 10, the pleats have a depth or radial dimension *r* of ¼ inch and an included angle *a* of about 35°. If the pleat angle *a* is made too small, (smaller than 20°) the cake of dust that develops on the outer surface of the pleated element P will become wedged between the pleats and will be difficult to dislodge by pulsed air jet cleaning. On the other hand, as the pleat angle *a* increases, the total filter area decreases, assuming the other dimensions of the filter remain constant. The example given, wherein the diameter *d* is 2.37 inches (FIG. 9), the radial depth *r* ¼ and the pleat angle *a* is the preferred angle of about 35° (FIG. 10), provides a filter element having 48 pleats or 96 panels. With this design, each pleated filter element P has a total area of 2 sqaure feet and yet it is compact, is only about 12 inches long and is readily cleaned by pulsed air jets. The arrows on FIG. 10 show the flow of air induced by the blower B, the air from the cleaning jets flows outwardly through the element.

The mounting and other details of construction of a filter cartridge C are shown in FIG. 8. The upper end of the pleated element P is molded into a grommet 190 formed of rubber-like material in which may be one of the relatively flexible plastic polymers, such as a Neoprene compound. The exact composition of the grommet is not critical, so long as it is flexible enough to be snapped into place in the partition 102 and is strong enough to remain in place during service. The upper end of the pleated element P is molded into the grommet 190 at 192 and the grommet has an annular opening 194 that has a diameter of about ¾ inches to 1 inch, which range of diameters provides adequate air jet cleaning action along the upper portions of the pleated filter element. The pleated paper element P is easily cleaned and is relatively short, having a length *l* of only 1 foot in the present example. These factors increase the effectiveness of the pulsed jets of air used to clean the filter. The grommet 190 is peripherally grooved at 196 and is bevelled at 198 to facilitate snapping the grommet into an aperture 202 formed in the partition 102.

The lower end of the pleated filter element P is closed by a plastic end cap 204, bonded to the element at 206. It has been found that under wet operating conditions, some radial restraint of the filter element P against the internal force of jet air cleaning is preferable. In order to provide this restraint, two annular restraining bands 210 may be fitted to surround the element. These bands need not extend the full length of the element which minimizes interference to the blowing off of the dust cake accumulated on the exterior of the element during air jet cleaning. In order to prevent collapse of the pleated filter element, a coiled wire spring 212 is provided which fits against the inner periphery of the pleats.

One of the important advantages of the present invention is the small volume required for the array F of filter cartridges C. As seen in FIGS. 3 and 5, four rows of cartridges are provided and as seen in FIG. 4, there are 11 cartridges in each row. The spacing between centers of the cartridges C is about 3⅛ inches and with 2.37 inches diameter pleated elements P the spacing between the peripheries of the pleated elements is about ¾ of an inch, which spacing is illustrated in FIGS. 3 and 4. This provides ample air passages between the pleated elements and permits grasping of the cartridges for insertion, removal and replacement.

With the cartridge construction in the example shown in FIGS. 8 – 10, having the radial dimensions *r* of the pleats ¼ inch the exterior angle *a* between pleat walls of about 35 degrees and an external diameter *d* a pleated element P of 2.37 inches, 48 pleats (two walls per pleat) per element are provided. Thus the filtering area of each pleated element P is 288 square inches, or 2 square feet. The array in the filter unit F of filters employing a total of 44 filter cartridges has a total filter area of 88 square feet.

The 3 inches diameter grommets that mount the 44 filter elements occupy an area that is about 35 inches long, 12½ inches wide and the cartridges C extend about 12½ inches below their mounting partition. This gives a total volume of the space required to mount and enclose the array F of filter cartridges C of 3.16 cubic feet. Since the filters have total filter area of 88 square feet, the above configuration gives a ratio of filter area to the volume required by the filters of 88/3.16 or an area/volume ratio of just under 29. This high area/volume ratio makes it possible to mount an effective filter system in a small space, which is particularly advantageous in industrial sweepers or the like such as that described in detail in this specification. The addition of rows of filter cartridges would increase the rearward extend of the array into the hopper. This, in turn, would reduce the volume of debris that could be collected without interference with the filters.

Reference has been made to Leliaert patent, U.S. Pat. No. 3,853,509 which discloses a fabric filter element having six pleats. In this design, the diameter at the outer points of the filter is eight inches while in the radius to the inner folds of the elements (the inner points for the outer cage) is in the order of 1 – 1½ inches, and the filter elements are on 6 inches centers. The specification of the patent states that this six point filter element provides a total filter area of 2.81 square feet per foot of filter length and mentions that the points of one tube can be telescoped to extend into the recessed portion of adjacent tubes so that 8 inches diameter filters can be on 6 inches centers. Attempts to lay out the aforesaid design gives an element to element spacing of about ¾ inch but the elements must be carefully oriented about their axes to avoid touching and the rows must be somewhat staggered. With this arrangement, five rows of six filters per row will provide 30 filters having a total filter area of 84 square feet.

Since the interlocking of the six prong filters of the Leliaert patent do not save as much space as might be expected, a 5 × 6 array of 30 filters 12½ inches deep will occupy a space about 36 inches long by 34 inches wide so that the total filter area of 84 square feet will occupy a volume of 8.8 cubic feet. This gives a ratio of filter area/filter volume of 84/8.8 or 9.5 as compared to the corresponding ratio of about 29 with applicant's construction.

Another manner of comparing the effectiveness of a pleated filter is to examine the ratio of the unfolded length of the pleated filter element with the filter element circumference. In the preferred embodiment of the present invention the circumference of the 2.37 inches diameter filter element P is 7.45 inches and the unfolded length of a 48 pleat filter having pleats ¼ inch deep equals 24 inches. This gives a ratio of the unfolded length of the pleats to the filter element circumference of 24/7.45 or a ratio of 3.22.

In the six point, 8 inches diameter pleated bag design, such as that of Leliaert, the pleats are about 3 inches deep and the bag circumference is about 25 inches. The unfolded pleat length is about 36. This gives a ratio of unfolded pleat length to filter circumference 36/25 or 1.44 as compared to 3.22 for the preferred embodiment of the present invention.

If a six point pleated filter element were scaled down to have an external diameter of 2.37 inches, as in the preferred embodiment of the present invention, the radial dimension of each of the 12 pleats would be somewhat less than ¾ inch and the unfolded length of the pleated filter element would be 9 inches. If the cartridge is one foot long, as in that of the present invention, each cartridge would have an area of 0.75 square feet. In order to provide the total filter area of 88 square feet provided by the 44 filters illustrated as an embodiment in applicant's system, the scaled down 6 point filter design would require 88/0.75 or 117 filters. Even if these filters were slightly interdigitated, the total volume required to provide 88 square feet of filter area would be considerably greater than the volume of 3.16 cubic feet required to encompass the filter assembly F of the present embodiment of the invention as applied to a sweeper. Actually, in accordance with the present invention, it is desirable that the filter elements P be spaced for unimpeded air flow as well as for grasping and replacement. Interdigitation of the points of the filter elements would hinder these actions. Also, to avoid point to point contact in the interdigitated filters would require that each filter be carefully positioned circumferentially relative to the other filters surrounding it. This would be a tedious and impractical arrangement particularly if the filters are to be periodically removed for service or replacement.

In addition to the area/volume ratio previously referred to (equal to about 29 in the preferred embodiment of the invention), pleated filter effectiveness can be related to the ratio of the unfolded length of the pleated filter element to the external circumference of the pleated element. In the system being described, the ratio of the unfolded length of the filter paper in the element P and the element circumference is 3.22. Assuming a given diameter $d$ of the pleated filter element and a given pleat depth $r$, increasing the number of pleats would increase the unfolded length of the element and hence would increase the aforesaid ratio. However, the exterior angle between the pleats would be decreased and applicant's experience is that if the exterior pleat angle is decreased to less than 20°, wedging of the filter cake in the pleats renders cleaning of the filter difficult, particularly by reverse pulse cleaning. Similarly increasing the depth $r$ of the pleats while maintaining the same number of pleats and the same pleated element diameter decreases the exterior angle between the pleats and increases the wedging effect on the filter cake. Although a range of pleat angles of 20° to about 35° is acceptable, an angle of about 35° is preferred because a filter element having pleats at this angle provides a relatively large unfolded filter area for a given element diameter, and there is little tendency for the filter cake to become wedged in the pleats.

The Filter Cleaning System

The pleated filter elements P of the filter unit F of the present invention are periodically cleaned by pulsed jets of air directed into the open upper ends of the cartridges C. Since the filter elements P are made of a resin impregnated paper and since they are pleated to provide a relatively large filter area in a short cartridge (about 1 foot long in the preferred embodiment), the aforesaid jet pulses of filter cleaning air are effective, even though no Venturi or other tubes are mounted inside of the filter cartridges and no nozzles or Venturis need depend from the air pipes that provide the air jets. As mentioned, tubes disposed within the upper ends of the filter cartridge provide a tortuous air flow path. Tubes between the filter cartridges and the air pipes can increase the total depth of the filter unit. Also, tubes projecting up from the filter cartridges to the cleaning air pipes increase the cost of each cartridge and can interfere with removal and replacement of the filter cartridges.

As seen in FIGS. 5 and 6, the air cleaning system incorporates four parallel air pipes or tubes 220, there being one tube disposed over the center of each row of 11 cartridges C. Each tube 220 is provided with an aperture or nozzle 222 that is placed substantially on the axis of the underlying filter cartridge. In the embodiment being described, the internal diameter of the tubes 220 is 1.87 inches and the diameter of the nozzles 222 is 0.106 inch. The far ends and the intermediate portions of the tubes 220 are mounted in plates 138, 138a that depend from the lid 130. The tubes are spaced about 1¾ inches to 2 inches above the filter cartridges, which provides a vertically compact installation. The air receiving end of each tube 220 extends from a valve 224 and each valve is connected by a short pipe 225 to an air manifold 226 (FIGS. 5 and 6). Each valve 224 is operated by a solenoid 228. The details of these valves are not critical to the present invention and a suitable valve is known as the ASCO valve, manufactured by the Automatic Switch Company in New Jersey.

In order to accommodate raising of the lid 130 that mounts the air cleaning system, one end of the air manifold 226 is connected to a flexible hose 234 that is given a hair pin shape when the lid 130 is closed (FIG. 5) and the other end of the hose 234 connects to a fitting 236 (FIG. 7) that is mounted on the flange 110 of the hopper. As seen by broken lines in FIG. 6, the fitting 236 is connected by an air line 238 to the compressor 180 which compressor is capable of delivering 3.55 cubic feet of air per minute.

The solenoids 228 for the valves are controlled by a timer 230 which makes electrical connections to each solenoid by electric lines indicated diagrammatically at 232 (FIG. 6). The details of the timer 230 are not critical to the present invention, although preferably the timer is mounted in the lid 130 and employs solid state components that provide sequential valve opening signals to the valve solenoids without need for mechanical connections.

The normal pressure in the air manifold 226 is 100 psi and the timer 230 is constructed to open each solenoid valve 224 and provide a pulse of air through the associated jet tube 220 that has a duration of 0.1 seconds. This directs high velocity air jets through the nozzle apertures or 222 in the air tubes 220 into the cartridges, as indicated in FIG. 8. With the system just described, the total volume of air emitted from the 11 nozzles 222 in each air tube 220 is equal to 0.25 cubic feet per 0.1 second pulse. The air tubes 220 are pulsed sequentially with a time lapse between pulses of 6 seconds, the result being that each tube 220 receives a pulse every 24 seconds and the corresponding row of 11 cartridges under the tube are thereby cleaned by the action of a pulse every 24 seconds.

This cleaning action takes place without interrupting the normal operation of the sweeper in that the blower B continues to draw air through 33 filters while any given row of 11 filters is being cleaned by a jet pulse of air that lasts about 0.1 seconds. The combination of impregnated pleated paper construction having a relatively large number of pleats at an angle $a$ of about 35° (FIG. 10) with pleats having a radial depth $r$ of about ¼ inch prevents wedging of the filter cake into the pleats and insures that the majority of the cake will be blown clear of the pleated paper element P and will drop down into the hopper during each pusle cleaning action.

Having completed a detailed description of the invention, it can be seen that when embodied in a sweeper where space is at a premium, effective dust filtering action is provided while providing a relatively large air flow into the hopper and through the filters. For example, the blower B when driven at a speed of 3500/4000 rpm is capable of drawing a volume of 900 cubic feet per minute of air at 5 inches water gauge differential pressure. This results in a high velocity flow rate of air at the zones where the air is drawn in under the flaps that surround the broom. In the present example the air velocity at these zones is about 6000 – 7000 feet per minute. Due to the properly designed pleated paper construction of the filter cartridges and the pulse jet cleaning system the filters will readily pass 900 c.f.m. of air without a significant drop in air flow during operation. The service life of the filter cartridges is long because of their construction, the manner in which they are protected and because the cleaning system does not permit the accumulation of heavy deposits on the cartridges. The net result is that a large proportion of the dust raised by the broom is picked up by the sweeper and is not swirled around the surface being cleaned. This dust is effectively filtered and whatever dust does pass through the filters and is discharged to the atmosphere by the blower is of a size so small as not to be visible. Whether visible or not, the amount of dust discharged through the atmosphere is small and yet the effectiveness of the sweeper in removing the dust and dirt particles stirred up by the broom is high.

Although the best mode contemplated for carrying out the present invention has been herein shown and described, it will be apparent that modification and variation may be made without departing from what is regarded to be the subject matter of the invention.

I claim:

1. In a surface cleaner which picks up debris that includes dust particles, said cleaner being a self-propelled mobile vehicle comprising an enclosure having a floor, opposed side walls, opposed end walls and a top wall, a partition dividing the enclosure into a dust laden air chamber and a filtered air chamber, debris pickup means for delivering debris to said dust laden air chamber, said partition having a generally horizontal portion with a plurality of openings therein, a plurality of porous filters mounted on said partition, each filter having one open end connected to one of said partition openings and projecting from the opening into said dust laden air chamber, an inlet opening in said latter chamber for admitting dust laden air, a blower, means for connecting said filtered air chamber to the intake of said blower, and means in said filtered air chamber for directing pulsed jets of cleaning air into the open ends of said filters for dislodging dust accumulations on the outer surfaces of the filters; the improvement wherein said filters comprise tubular cartridges that are removably mounted in said partition and have filter elements formed of pleated, resin-impregnated porous paper, said partition extending between the opposed side walls of said enclosure and projecting from one end wall of the enclosure toward the opposed end wall, the generally horizontal portion of said partition stopping short of said opposed end wall at an intermediate position within said enclosure and by a distance sufficient to provide an access opening into said dust laden air chamber for access to said latter air chamber and for manipulative access to said filter elements, a flange projecting upwardly from said partition at its intermediate position, the top wall of said chamber comprising a displaceable lid, and means for sealing said lid to the side and end walls of said enclosure, and to the upper edge of said partition flange to isolate said filtered air chamber from the dust laden air chamber.

2. In a surface cleaner which picks up debris that includes dust particles, said cleaner being a self propelled mobile vehicle comprising an enclosure, a partition for dividing the enclosure into a dust laden air chamber and a filtered air chamber, said partition having a plurality of openings therein, a filter unit comprising a plurality of porous filters, each filter having one open end connected to a partition opening and projecting from the opening into said dust laden air chamber, an inlet opening in said dust laden air chamber for admitting dust laden air, debris pick up means for delivering debris to said inlet opening, a blower, means for connecting said filtered air chamber to the intake of said blower, and filter cleaning means in said filtered air chamber comprising means for directing pulsed jets of air into the open ends of said filters for periodically dislodging dust accumulations on the outer surfaces of the filter during normal operation of the cleaner; the improvement wherein said filters comprise elongate tubular filter elements that are formed of resin-impregnated porous paper, said paper being formed into a continuous circular array of connected pleats with each pleat being formed of two generally radial panels which are connected at their radially inner ends along a line parallel to the axis of the tubular element and which panels diverge from their connection line such as to form an exterior included angle between the panels in the range of 20° to about 35°, the peripheries of said elements being spaced from one another.

3. The cleaner of claim 1, wherein the ratio of the total area of the panels of all of the filter elements in square feet to the volume in cubic feet occupied by all of the filter elements when they are mounted on said partition is about 29.

4. The cleaner of claim 1, wherein the ratio of the sum of the radial widths of the panels of each filter element to the circumference of each tubular pleated filter element is about 3.22.

5. The cleaner of claim 1, wherein the exterior included angle between the panels of the filter element pleats is about 35°.

* * * * *